(12) United States Patent
Sanjeevaiah Krishnaiah et al.

(10) Patent No.: US 11,037,202 B2
(45) Date of Patent: Jun. 15, 2021

(54) CONTEXTUAL DATA IN AUGMENTED REALITY PROCESSING FOR ITEM RECOMMENDATIONS

(71) Applicant: PAYPAL, INC., San Jose, CA (US)

(72) Inventors: Akshay Sanjeevaiah Krishnaiah, San Jose, CA (US); Cheng Tian, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 360 days.

(21) Appl. No.: 15/391,526

(22) Filed: Dec. 27, 2016

(65) Prior Publication Data

US 2018/0181997 A1 Jun. 28, 2018

(51) Int. Cl.
*G06F 30/00* (2020.01)
*G06Q 30/02* (2012.01)
(Continued)

(52) U.S. Cl.
CPC ......... *G06Q 30/0269* (2013.01); *G06F 3/011* (2013.01); *G06F 3/0482* (2013.01);
(Continued)

(58) Field of Classification Search
None
See application file for complete search history.

(56) References Cited

U.S. PATENT DOCUMENTS 7,318,049 B2 * 1/2008 Iannacci ............... G06Q 20/10
705/39

8,386,506 B2 * 2/2013 Martinez ............... H04L 51/00
707/759

(Continued)

FOREIGN PATENT DOCUMENTS

| EP | 838787 A2 * | 9/1997 | ............ G06T 15/10 |
| WO | WO-2005004534 A1 * | 1/2005 | ............ H04S 1/005 |
| WO | WO-2009128859 A1 * | 10/2009 | ............ H04S 1/002 |

OTHER PUBLICATIONS

Sanni Siltanen. Theory and applications of marker-based augmented reality. (Jun. 18, 2012). Retrieved on line Feb. 2, 2021. https://www.vttresearch.com/sites/default/files/pdf/science/2012/S3.pdf (Year: 2012).*

(Continued)

*Primary Examiner* — James A Reagan
(74) *Attorney, Agent, or Firm* — Haynes and Boone, LLP

(57) ABSTRACT

There are provided systems and methods for contextual data in augmented reality processing for item recommendations. A first user may provide a recommendation to a second user of an item viewed by the first user through a communication device. The first user may tag the item, for example, through voice input or visual cues while viewing the item at a physical merchant location, or through menu selections within an interface displaying a browsing window of the first user. The first user may provide contextual data that may be used to determine that the first user is recommending the item to the second user, such as voice data that includes an identifier for the second user or visual cues within audiovisual content captured of the item at the physical merchant location. During online browsing, the first user may provide the contextual data through actions, menus selections, and data entry.

20 Claims, 7 Drawing Sheets

(51) Int. Cl.
*G06F 3/0484* (2013.01)
*G06T 11/00* (2006.01)
*H04L 29/08* (2006.01)
*G06F 3/0482* (2013.01)
*H04L 12/58* (2006.01)
*G06F 3/01* (2006.01)
*G06F 16/9032* (2019.01)
*G06F 3/16* (2006.01)

(52) U.S. Cl.
CPC .......... *G06F 3/04842* (2013.01); *G06T 11/00* (2013.01); *H04L 51/10* (2013.01); *H04L 67/18* (2013.01); *H04L 67/20* (2013.01); *H04L 67/22* (2013.01); *G06F 3/167* (2013.01); *G06F 16/90324* (2019.01); *H04L 51/32* (2013.01)

(56) References Cited

U.S. PATENT DOCUMENTS

| 8,452,855 | B2* | 5/2013 | Higgins | H04L 67/06 709/219 |
| 8,583,668 | B2* | 11/2013 | Higgins | G06F 16/29 707/758 |
| 9,158,794 | B2* | 10/2015 | Higgins | H04W 4/18 |
| 2008/0207242 | A1* | 8/2008 | Ekberg | H04W 4/08 455/518 |
| 2014/0278998 | A1* | 9/2014 | Systrom | G06Q 30/0277 705/14.57 |
| 2016/0286244 | A1* | 9/2016 | Chang | H04N 21/21805 |

OTHER PUBLICATIONS

Karen L. Schrier. Revolutionizing History Education: Using Augmented Reality Games to Teach Histories. (Nov. 1, 2016). Retrieved on line Feb. 2, 2021. https://cmsw.mit.edu/wp/wp-content/uploads/2016/10/146381100-Karen-Schrier-Revolutionizing-History-Education-Using-Augmented-Reality-Games-to-Teac (Year: 2016).*

Shanshan Li. Assessing the User Experience When Using Mobile Augmented Reality in Advertising. (May 15, 2014). Retrieved on line Feb. 2, 2021. https://docs.lib.purdue.edu/cgi/viewcontent.cgi?referer=&httpsredir=1&article=1232&context=open_access_theses (Year: 2014).*

* cited by examiner

US 11,037,202 B2

CONTEXTUAL DATA IN AUGMENTED REALITY PROCESSING FOR ITEM RECOMMENDATIONS

TECHNICAL FIELD

The present application generally relates to capturing audiovisual data to generate an augmented reality; and more specifically to contextual data in augmented reality processing for item recommendations.

BACKGROUND

Various types of service providers may provide recommendation and processing services to users, including merchants, advertisers, transaction processors, and other types of entities that may provide various type of transaction processing services for one or more items. Such processing services may include transaction processing for transactions between a user and another entity, such as another user, merchant, business, or other entities that may engage in transactions with users. In order to promote further transactions between users and merchants, for example, to assist merchants in advertisement and/or to alert users of various items of interest to the users, the service providers may further provide recommendations to the users of items available from merchants. In this regard, general advertisement strategies may alert users of coupons, deals, or other items that the user has to browse through to find items of interest, and therefore may be ignored or given only cursory review. Some service providers may provide targeted advertisements or recommendations from other users, but such services are used based on online shopping experiences and input, and does not provide processing of real-world data that may be of interest to other users.

Figure 1:
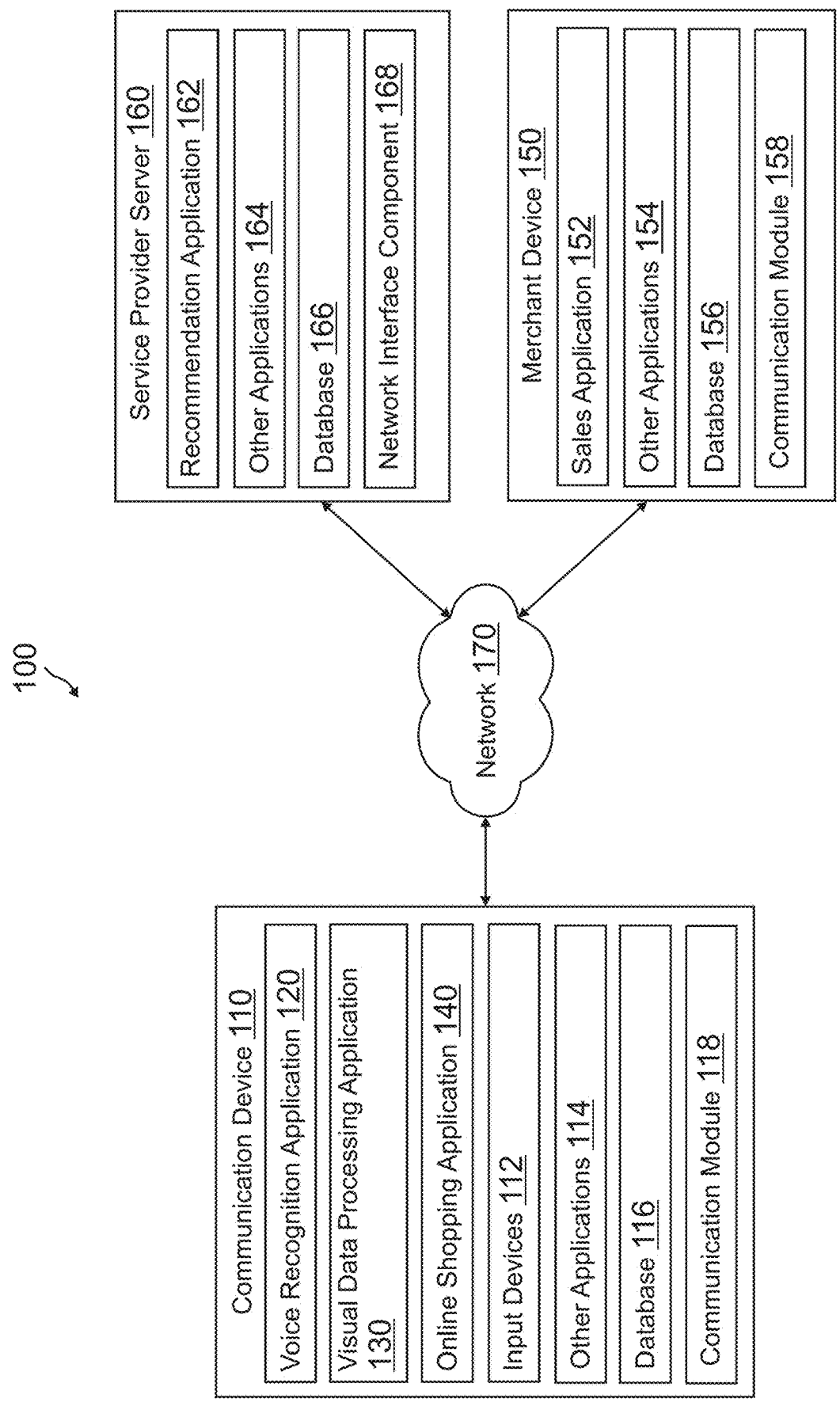
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for contextual data in augmented reality processing for item recommendations. Systems suitable for practicing methods of the present disclosure are also provided.

According to various embodiments, a user may utilize a communication device while performing browsing or shopping actions, including real-world shopping at physical merchant locations and online shopping through one or more virtual online marketplaces. The user may view an item, such as a real-world object for sale or online offer for sale of an item, which may be of interest to another user, such as a friend, family member, co-worker, or similar user known to the first user. Thus, the first user may utilize the communication device to tag the item. The tagging of the item may be performed through selection of the item in an interface displaying the item, such as captured audiovisual content of the item or browsing data displaying the item for sale on an online marketplace. The user may further provide contextual data that is used to determine that the tag corresponds to a recommendation of the item to the second user by the first user. For example, while browsing an online marketplace and tagging an item for the second user, the first user may provide identification of the second user, an interest related to the second user, a social connection to the second user, or other information that may be used to determine that the first user is recommending the item to the second user. Similarly, during real-world item browsing, the user may utilize their communication device to provide voice data or other audio data, as well as visual cues with visual data, to provide context to the tag of a real-world object. Using the tag, the contextual data, and/or the captured shopping data, a recommendation for the second user may be generated. In various embodiments, the real-world environment may be displayed to the user through an augmented reality in a graphical user interface, where the tag, contextual data, and/or recommendation are displayed to the user as graphics overlaid onto the displayed environment. The recommendation may then be communicated to the second user through a communication channel selected by a service provider, such as a social networking feed, messaging service, or other type of electronic communication.

In this regard, the first user may utilize a communication device to capture content or other data including a representation of the item. For example, audio, visual, or audiovisual data at a physical merchant location may capture a representation of the item as an object within an environment at the physical merchant location. Thus, the first user's communication device may include a camera, microphone, or other input device that may be used to capture content that includes the object, such as an image or video of the object as well as nearby objects in the real-world environment. Additionally, the data captured at a physical merchant location may include audio or video data that further may be used to determine the object tagged by the first user and/or the recommendation made to a second user known to the first user. For example, audio tags, such as statements or other verbal instructions, may be made by the first user speaking that identifies the object and/or the second user. The audio tags may include directly stated information for the object or the second user, such as "I think Alice would like this chair," while capturing only one chair. In other embodiments, the audio tags may be more vague, and be required to be processed using additional contextual data, such as "I think my sister needs a new dresser," where the audio tag may be required to be processed with additional contextual data to determine a tag of an item for purchase by a second user corresponding to the first user's sister.

Video tags and cues may as be made in video and audiovisual data, including pointing to objects, identifying object by their locations within a space, identifying a second or third user in a video, or other types of visual cues that can be used to determine a recommendation for the second user based on the tag and contextual information within the captured data. Within an image or video, the location of items, objects, or users may correspond to tag data to identify the second user or the item, such as "Alice would love that chair next to Bill," or "Alice would love that sofa in the back right corner." Video cues, such as pointing to an object, user, or location within the environment may be used as tag data. Additionally, the video or other image data may be required to be processed to determine and/or recognize the item within the data. In this regard, visual data (e.g., images and/or videos) capturing one or more items may be processed to recognize the item within the image. In this regard, image processing techniques and recognition algorithms may be utilized to determine an item within visual data. One or more databases may also be accessed that allows recognition, detection, and identification of the item in the visual data, for example, by comparing the visual data to stored parameters, data, and/or information for the item or other object that identifies the item. Machine learning algorithms may also be used to contextually determine or recognize an item in visual data, for example, based on past tags, recommendations, and/or identification of the item in other visual data, stored visual data of the item, and/or contextual information for the visual data (e.g., where the visual data was captured, when the visual data was captured, color of the item, environmental information in the visual data, contrast and/or lighting in the visual data, and other context related data for the visual data). Thus, computer vision algorithms, image processing techniques, and/or machine learning processes may be utilized to determine and identify an item in visual data captured by the first user. Moreover, in various embodiments, the device capturing the audio, video, or audiovisual data may correspond to a device at the physical merchant location, including devices provided and maintained by the merchant or the service provider, which is capable of capturing the data including the tag data and additional contextual data used to determine the recommendation to the second user.

In other embodiments, the data that includes the object or other item for sale may correspond to other types of shopping or item browsing information, such as online shopping data or a user's online browsing information that displays information for the item. For example, the first user may browse items for sale in an online marketplace or may view an item for sale through an advertisement in a message, email, on a website, or otherwise presented to the first user. The first user may also otherwise view an object, for example, through images or video on a content sharing platform or social networking platform. The first user may provide tags within the virtual shopping or browsing data, for example, through entering input while viewing the item for sale or other displayed object. A toolbar, application, or other process may allow the user to enter the tag data and other contextual data through one or more menu options and/or input fields accepting input of data through an input device (e.g., a mouse, keyboard, touchscreen interface, etc.). Thus, the service provider generating the recommendations may provide a process to create the tags and may determine the tags from user input. For example, a toolbar, application, or other process for the service provider may allow the user to enter input that is transmitted to the service provider. The service provider may also query the user through the user's computing device to enter the tags, and may provide menu options and input fields to enter tag data including contextual data for use in generating the recommendation.

Thus, the item shopping or browsing data (e.g., audio data, video data, audiovisual data, online shopping data, and/or computer/online browsing data) may be transmitted to the service provider from the communication device associated with the first user or at the physical merchant location for the first user. The item shopping or browsing data includes the tag data, as well as further information used to determine contextual data for a recommendation, for example, what item or object is being recommended to which user known to the first user. For example, the service provider may detect a location of a user, or the location of the user may be tagged to the audio, video, or audiovisual data in the metadata for the data. The location of the user may be determined through a GPS module or locator associated with the user, such as a GPS locator of the user's computing device. The location of the first user may be used to determine the object or the second user, for example, by co-locating the first user with the second user or identifying the object sold at the location.

Other metadata may also be associated with the item shopping or browsing data, including a time of capture or browsing, how the data was created (e.g., from what website or platform, which type of device or the device capturing the data), why the data was captured (e.g., in response to an advertisement, viewing items in a store, etc.), or other type of metadata informing the service provider about the item shopping or browsing data. Information within the data may also be used to determine the contextual data, such as the audio tags, statements, or conversation, the video cues, or other type over data. In online shopping data, the contextual data may correspond to social networking or messaging contacts, or users/objects associated with an online location or received advertisement. Utilizing the item shopping or browsing data, the contextual data may be determined, which may correspond to information that identifies the second user or the object. Thus, the contextual data may correspond to any data within the received item shopping or browsing data that identifies or causes identification of the second user or the object, including the metadata and direct data within the item shopping or browsing data.

In various embodiments, the tags and contextual information may be utilized with additional known information for the object or the second user that also allows identification of the object or the second user. For example, additional information may correspond to an interest or purchase preference of the second user, such as an interest in black furniture on a shopping site, or a shopping list including a piece of black furniture. Thus, if the first user creates a tag with more ambiguous information, such as, "I just heard a friend say they were interested in black furniture, they would love this black chair!" the recommendation may be determined based on the expressed interest of the second user, which may be retrieved from the online source. A third user captured in video data may be used to determine the second user, where the first user may state, "Your sister would love this chair." Thus, other known contacts (including the second user known to the first user or a contact of a third user including the second user), interests by those contacts, purchase preferences of those contacts, and/or demographic information about those contacts (e.g., demographic information about the first user, the second user, and/or another third user) may be used to determine the item and/or second user for the recommendation.

Additional information may also be used to provide a finer degree of granularity to determination and identification of the item within the visual data or online shopping/browsing data. For example, additional information in the visual data or online shopping/browsing data, or metadata for the captured data, may be used to determine and/or identify the item, a type of the item, amount or number of the item, or other specific details of the item (e.g., a brand, a sub-group of the item, a color/flavor/other type of the item, etc.). Information in the visual data that may be used to determine a corresponding item may include text within the image, color, contrast, lighting, geographic location, time of capture of the visual data, audio within the visual data, or other data within the visual data or associated with the visual data, such as metadata. In this regard, different items may be sold in different flavors, types, or other versions in specific locations, which may be detected based on color, description on packaging, geographic location, or other information. Similarly, online shopping or browsing data captured by the first user and tagged for processing and generation of a recommendation may further include additional information necessary to determine the item, such as a website or online location visited and captured for data, time of day, item description or metadata, or other information. Thus, determination of the specific item may be based on additional information within or associated with the captured data.

Once the item being recommended is determined with the second user that the item is being recommended to by the first user, the service provider may generate a recommendation to the second user. The recommendation generated by the service provider may correspond to an offer for sale of the item, such as an advertisement with corresponding purchase option that may initiate a process to purchase the item online. In other embodiments where the item may not be available for purchase online, the recommendation may correspond to an image, video, or other data representing the item with corresponding information necessary to find and purchase the item, such as a merchant location selling the item. The recommendation may include information to locate the merchant and/or contact the merchant, including an email address, phone number, website, physical address, or other contact information. The second user may then purchase, reserve, or otherwise request the item in the recommendation. The recommendation may also include first user information for the first user, such as "Bill recommended this item to you Alice!" The first user information may include contact information for the first user, a time of recommendation, a location for the recommendation, or other information associated with generation of the recommendation. Where provided by the first user, the recommendation may also include information associated with why the first user is recommending the item to the second user, for example, a statement such as "Bill recommended this black chair to you based on your interest in black furniture!"

In various embodiments where the item shopping or browsing data corresponds to captured images, video, or audiovisual content including an environment having the item recommended to the second user, the data having the item in the environment may be output to the first user on a display device of the user's communication device. For example, a mobile application associated with a camera of a mobile smart phone may display a viewfinder interface having the image or video that includes objects including the item in an environment, or may display the captured image or video through another graphical user interface of the application. The displayed environment may be augmented based on the tag data, the contextual data, and/or the recommendation to display such data back to the first user on the first user's device. For example, a tag may be displayed as a graphic overlaid onto the displayed environment, such as a highlight of the item, a box around the item, a pointer to the item, or other information. The recommendation may be displayed as a window including the recommendation that may be transmitted to the second user, or may correspond to text or other data for the recommendation, such as "You are recommending this chair to Alice." The recommendation may also be selectable and may be interacted with through one or more input device of the communication device.

Thus, an augmented reality having the environment with one or more computer generated graphics or other data may be output to the first user. The first user may interact with the augmented reality to change the tag, select certain contextual data in the environment to change or highlight specific contextual data, or otherwise alter the augmented reality. Therefore, the first user may view the tags and contextual data in the environment that causes generation of the recommendation, and may change the augmented reality as necessary to properly cause generation of the recommendation. Once the first user is satisfied that the recommendation displayed to the user in the augmented reality is correct, the first user may approve the recommendation for communication to the second user.

The service provider may communicate the generated recommendation to the second user. In various embodiments, in order to determine a best or most preferred process to transmit the recommendation to the second user, the service provider may determine an electronic communication channel for transmission of the recommendation to the second user. The selected electronic communication channel may be chosen based on preferences of the second user, such as a preference to receive recommendations through email, text, a messenger account, a social networking feed, or a popup advertisement. In other embodiments, the electronic communication channel may be selected based on usage of communication channels by the second user or based on a past history or viewing or responding to recommendations through a specific communication channel. The communication channel may be based on a channel where the recommendation is most likely to be viewed by the second user, which may be time based or based on a type of device currently being used or in possession of the second user. For example, if the user is currently away from home, the recommendation may be sent by text, where email or a social networking post may be transmitted to the user at home where the user is more likely to view the recommendation on a personal computer and respond to the recommendation when the user is at home.

The recommendation may also be presented to the second user as the recommendation in the augmented reality seen by the first user. For example, the recommendation may appear when the second user captures an image or video of an environment having the image. In various embodiments, a device of the second user may correspond to a wearable computing device, which may presented the recommendation overlaid onto currently viewed environments by the second user or environments captured by the device. For example, GOGGLE GLASS® may correspond to wearable eyeglasses with associated computing devices that may present the recommendation when the second user is viewing or in an environment corresponding to the item in the recommendation. In other embodiments, the recommendation may be displayed when the second user is browsing online items for sale, such as through a marketplace on a website or accessible through a dedicated application executing on a device. The recommendation may be displayed with additional information associated with the item. In this regard, the recommendation may include a number of purchases by other users, historical price information for the item in the recommendation, potential incentives or other savings for the item, item information and/or descriptions, or other information that may be relevant to provide in the recommendation, which may be overlaid in the augmented reality or presented through the device interface. The additional information may include social networking information, including a social graph or other relevant information from social networking contacts of the first and/or second users.

Additional information may be provided with the recommendation to incentivize the second user to purchase the item and/or assist the second user with the item. For example, the recommendation may include benefits, reviews, and/or other information for the item. The recommendation may also include tips on purchase and/or use of the item, such as other purchases recommended for purchase with the item and/or walkthroughs or tips on use of the item. The walkthroughs or tips may include visual data on how to use a similar virtual item displayed with the recommendation. The reviews may be specific to another application or platform, including YELP® reviews and/or reviews by a professional or known persona. The walkthrough or tips may also be displayed with other items captured in the environment, for example, as the second user travel through an environment having the item in the recommendation. The recommendation may also include selectable links or other information that In various embodiments, the recommendation may also be displayed to the second user with an interactive virtual reality having relevant information for the second user, which may also include captured visual data of an environment displayed as an augmented reality. For example, the recommendation for the item may display the item as a virtual object that may be displayed onto an environment for the second user, such as a captured image of the second user's home. Thus, the virtual object of the item in the recommendation may be displayed in an environment of the user of the item by the second user. In other embodiments, the virtual reality may also allow for the second user to place captured visual data of other items into the virtual reality to allow the second user to view what the item in the recommendation appears next to currently owned and/or items in possession of the second user. The virtual object may be alterable by the second user through changeable parameters, such as color, size, material, number, etc.

The service provider may receive feedback to the recommendation, which may be used in the future to determine recommendations and/or communication channels for transmission of the recommendations. Thus, depending on whether the second user responds to the recommendation, the service provider may utilize the response or lack of response to determine whether a recommendation may be transmitted using the communication channel to transmit future recommendations. The second user may also respond positively or negatively to the recommendation, which may be used to determine second user preferences in receiving recommendations and/or recommendations for certain items. Additionally, the service provider may receive a response from the second user indicating interest or no interest of the second user in receiving recommendations from the first user, and may determine the recommendations by the first user to the second user in line with the second user's interest in recommendations from the first user. The recommendation may also be displayed with other users' reactions and/or feedback. For example, a social networking platform may be linked to the recommendation so that friends and other contacts of the first user and/or the second user may be informed of the recommendation and provided with the opportunity to respond to the recommendation, for example, by providing a like or other response, posting a message or emoji, or otherwise providing feedback. The second user may solicit the feedback from the other users by posting the recommendation to the social networking platform, where the other users may view the recommendation and respond to the recommendation. The reactions may include filtered information specifically presented for the item within a smart device, such as a smart television where the second user may view the comments, reactions, and other feedback for the specific item and interact with the feedback, including selecting links and/or responding to comments. The second user may also solicit other types of reactions from other users, including group purchases, reviews, and/or links to additional information, discounts, or other incentives to assist the second user in determining whether to make the purchase.

Thus, in order to process a purchase of the item in the recommendation, one or more users may wish to engage in electronic transaction processing with one or more other users or merchants. For example, a user may wish to provide a payment to a merchant for a transaction for the item. The service provider may provide transaction processing services that may allow two or more entities (e.g., personal users, groups of users, merchants, etc.) to engage in electronic processing for a transaction. The service provider may further provide additional types of services, including account services and digital wallet service, for example, to store one or more financial instruments of the user for use in transaction processing and provide a digital wallet that may be utilized to perform transaction processing through tokenized payment services.

Thus, the user and/or the merchant may further be required to establish an account with the service provider in order to engage in transaction processing. The user and/or the merchant may be required to provide personal, business, or other identification information to establish the account, such as a name, address, Employer Identification Number (EIN), and/or other information. The user and/or the merchant may also be required to provide financial information, including payment cards (e.g., credit/debit cards), bank account information, gift cards, and/or benefits/incentives, which may be utilized to provide payments or otherwise engage in processing of another transaction. In order to create an account, the user and/or the merchant may be required to select an account name and/or provide authentication credentials, such as a password, personal identification number (PIN), security questions, and/or other authentication information. The service provider may utilize such information to create the account for the user, and provide the user with a digital wallet to the user that allows for electronic transaction processing. The digital wallet may store the user's financial instruments of the user and allow the user to process transactions through the digital wallet. In this regard, the service provider may provide a digital token, such as a data package, that represents the digital wallet and may approve the digital wallet for processing of a transaction with the service provider to a device that receives the token. Thus, the token may include data identifying the digital wallet (e.g., a token), as well as authentication information including an identifier for user of the digital wallet, which may be encrypted.

Once an account is created, the account may be accessed through a web browser from a website of the service provider and/or a dedicated application of the service provider, such as a mobile smart phone application. The user and/or the merchant may engage in transaction processing through accessing their respective account and providing transaction information for the transaction. Thus, the aforementioned token may be issued to the user and/or the merchant for their respective accounts, where the token may include data (which may be encrypted) allowing the service provider to identify the user and/or the merchant and their account, as well as authenticate the user and/or the merchant. As such, the token may be transmitted to other entities during transaction processing, which may allow the service to identify and authenticate the user's and/or the merchant's account and engage in transaction processing. Thus, the accounts may store information associated with each user, merchant, or other entity for use in transaction processing.

In this regard, a computing device for a user and/or a merchant, such as a communication device of a user or a merchant point-of-sale device of a merchant, may further include a mobile payment application or more generally a transaction processing application, which may be configured to send and receive payments to another party, such as another user and/or a merchant, or otherwise engage in transaction processing. In various embodiments, a website may provide the transaction processing services, and thus may be accessed by a web browser application. The application (or website) may be associated with a payment provider, such as PayPal® or other online payment provider service, which may provide payments and the other aforementioned transaction processing services on behalf of user, merchants, and other entities. The application may execute on the computing device for a user or a merchant, and may provide various functionalities and processes to the user and/or merchant. For example, a user may utilize the application to send and/or receive payments between the user and another user/merchant for one or more items purchased in a transaction. The merchant may similarly send and/or receive payments between the merchant and another user/merchant, which may include receiving payment for transactions.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a merchant device 150, and a service provider server 160 in communication over a network 170. The first user (not shown) may utilize communication device 110 to utilize the various features available for communication device 110, which may include processes and/or applications associated with service provider server 160 to make recommendations to a second user (not shown). The first user may utilize communication device 110 to capture shopping or browsing data of an item or other object, including online data and/or real-world data. The data may include at least one tag by the first user of one or more items or objects being recommended to the second user. Additionally, the data may include contextual data that may be determined, which may include identification of the second user and/or the item. Once processed, service provider server 160 may generate a recommendation, which may correspond to an advertisement, offer for sale, or other information identifying the item to the second user. In various embodiments, the recommendation may be determined using inventory and/or sale information available from merchant device 150. Service provider sever 160 may then output the recommendation to the second user using a selected electronic communication channel.

Communication device 110, merchant device 150, and service provider server 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Communication device 110 may be implemented as a communication device that may utilize appropriate hardware and software configured for wired and/or wireless communication with merchant device 150, and/or service provider server 160. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Communication device 110 of FIG. 1 contains a voice recognition application 120, a visual data processing application 130, an online shopping application 140, input devices 112, other applications 114, a database 116, and a communication module 118. Online shopping application 140 and other applications 114 may correspond to executable processes, procedures, and/or applications with associated hardware. In other embodiments, communication device 110 may include additional or different modules having specialized hardware and/or software as required.

Voice recognition application 120 may correspond to one or more processes to execute software modules and associated devices of communication device 110 to receive and/or record audio data, as well as process the audio data to determine tags within the audio data and/or in associated audiovisual data and other information necessary to determine a recommendation. In this regard, voice recognition application may correspond to specialized hardware and/or software utilized by a user of communication device 110 to receive or record audio data, for example, using a microphone of input devices 112. The audio data may include statements, conversation, and other spoken content by a first user recommending an item for a second user. In this regard, the audio data may include tag data, such as a name of an object, identification of the object and/or contextual data allowing recognition of the object (e.g., a location of the object in video data, a color of the object, a shape or type of the object, a description of the object, etc.). The object may correspond to an item recommended to the second user for purchase. The audio data may also include identification of the second user or other contextual information allowing for identification of the second user. The audio data may be processed with video data to cause generation of a tag and/or a recommendation within an environment displayed as an augmented reality through an output display interface and device of communication device 110. However, in other embodiments, voice recognition application 120 may instead correspond to an audio recording application, where the voice recognition, voice to text processing, or other audio processing features to determine a tag and/or process received audio information for determination of contextual information and/or a recommendation may be performed by service provider server 160.

Visual data processing application 130 may correspond to one or more processes to execute software modules and associated devices of communication device 110 to receive or record visual data and process the visual data to determine a tag of an object in an environment that is recommended to a second user by the first user associated with communication device 110, as well as generate the contextual and other data necessary to generate the recommendation. In this regard, visual data processing application 130 may correspond to specialized hardware and/or software utilized by a user of communication device 110 that first receives, captures, and/or records video data, including audiovisual data that includes audio data processed by voice recognition application 120. Thus, visual data processing application 130 may utilize a camera or other optical/visual data capturing device of input devices 112. The captured video data may include tag data, for example, through visual cues within the video data, such as pointing at an item or otherwise identifying an item. The tag data may be determined through the video data with the audio data processed by voice recognition application 120, for example, where the audio data identifies a location within the video data for the object or otherwise provides contextual data allowing for identification of the object. The video data may include the second user or other contextual data identifying the second user, including an image or video of the second user, a third user associated with the second user, an interest of the second user, and/or a purchase preference of the second user.

Additionally, the captured audio and/or visual data by voice recognition application 120 and/or visual data processing application 130 may be used to determine an augmented reality, where a tag and/or recommendation is displayed as graphics by visual data processing application 130 overlaid onto the displayed environment. Additionally, in other embodiments, visual data processing application 130 may instead correspond to n video recording application, where the video processing features to determine a tag and/or process received video information for determination of contextual information and/or a recommendation may be performed by service provider server 160.

Online shopping application 140 may correspond to one or more processes to execute software modules and associated devices of communication device 110 to perform online shopping and/or browsing for one or more items, tag the items, and recommend the items to a second user. In this regard, online shopping application 140 may correspond to specialized hardware and/or software utilized by a user of communication device 110 that initially allows the user to access an online marketplace or otherwise browse items available over a network, such as the Internet. The user may view an advertisement or offer for sale of an item. The user may also view objects within other online content, including posted images or videos, which may correspond to an item that the first user associated with communication device 110 is recommending to a second user. For example, images posted to another user's social networking feed or online image posting service may include objects that correspond to items for sale from a merchant or another user. The first user viewing the virtual content may tag an object or item in the content, and wish to recommend the item to a second user. The tag may include identification of the item including where the item is available, such as a merchant selling the item. The tag may also include additional information allowing identification of the second user, including an identifier for the second user or contextual information that may identify the second user. The online data as well as the tag data or other contextual data may be processed to determine the recommendation by online shopping application 140 and/or service provider server 160.

Online shopping application 140 may also provide transaction processing services, for example, through one or more processes that provide an interface to permit the user to enter input and other data for payment instruments, for example, through an input device (e.g., touch screen with a graphical user interface, keypad/keyboard, mouse, etc.) and/or through a data capture device (e.g., scanner, camera, other optical device, etc.). Such information may be stored with service provider server 160 for use with an online digital wallet stored to an account for the user with service provider server 160, which may be utilized for transaction processing with another entity, such as a merchant associated with merchant device 150. In various embodiments, information for the account may also be stored to communication device 110 for use in an offline environment. The account accessible through online shopping application 140 may be used to initiate, receive, and/or process/complete transactions using services provided by service provider server 160. Once entered, the payment instruments may be communicated to service provider server 160 over network 170 by online shopping application 140 for establishment and/or maintenance/update of the account and/or entry into the digital wallet for the user. The user of communication device 110 may also enter discounts and/or benefits to online shopping application 140 for storage to the digital wallet and use during transaction processing.

Online shopping application 140 may utilize one or more user interfaces, such as graphical user interfaces presented using an output display device of communication device 110, to enable the user associated with communication device 110 to perform transaction processing. In various embodiments, online shopping application 140 may correspond to a general browser application configured to retrieve, present, and communicate information over the Internet (e.g., utilize resources on the World Wide Web) or a private network. For example, online shopping application 140 may provide a web browser, which may send and receive information over network 170, including retrieving website information (e.g., a website for service provider server 160), presenting the website information to the user, and/or communicating information to the website. However, in other embodiments, online shopping application 140 may include a dedicated application of service provider server 160 or other entity (e.g., a merchant), which may be configured to assist in processing transactions. The interface(s) providing by online shopping application 140 may be utilized to enter transaction information, receive transaction information from merchant device 150, and/or initiate a process to communicate the preauthorized token to merchant device 150

Online shopping application 140 may be utilized to select payment instrument(s) for use in providing payment for a purchase transaction, transfer, or other financial process. Additionally, online shopping application 140 may utilize a digital wallet stored to an account with a payment provider, such as service provider server 160, as the payment instrument, for example, through providing a token that identifies the account and authenticates the user for use of the account. Online shopping application 140 may be utilized to view the results of payments, for example, using transaction histories, dispute resolution processes, and other post-transaction process.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications may include social networking applications, media viewing, and/or merchant applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices capable of displaying information to users and other output devices, including speakers.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with online shopping application 140 and/or other applications 114, identifiers associated with hardware of communication device 110, or other appropriate identifiers, such as identifiers used for payment/user/device authentication or identification, which may be communicated as identifying communication device 110 to service provider server 160. In various embodiments, account information and/or digital wallet information may be stored to database 116 for use by communication device 110. Database 116 may also store captured audio, video, or audiovisual content. Additionally, tag data, contextual data in the captured content, and/or a recommendation determined using the data may be stored to database 116 where applicable. Moreover, an augmented reality and/or graphics overlaid onto a display of a captured environment may be stored to database 116.

Communication device 110 includes at least one communication module 118 adapted to communicate with merchant device 150 and/or service provider server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices (e.g., merchant device 150) using short range communications, such as Bluetooth Low Energy, LTE Direct, WiFi, radio frequency, infrared, Bluetooth, and near field communications.

Merchant device 150 may be implemented using any appropriate hardware and software configured for wired and/or wireless communication with communication device 110 and/or service provider server 160. Thus, merchant device 150 may include architecture to provide sales of items, for example, through a physical merchant location or online merchant marketplace. In this regard, merchant device 150 may correspond to a point-of-sale device configured to provide transaction processing, or other type of device, including personal computing devices, mobile smart phones, and/or wearable computing devices. Merchant device 150 may also correspond to a server or other device providing an online marketplace where items may be purchased and/or item information associated with a captured object in an environment may be retrieved. Merchant device 150 may further be used to process payments for items and provide incentives for purchase of items and/or advertisement of items to other users. Although only one merchant device is shown, a plurality of merchant devices may function similarly.

Merchant device 150 of FIG. 1 contains a sales application 152, other applications 154, a database 156, and a communication module 158. Sales application 152 and other applications 154 may correspond to processes, procedures, and/or applications executable by a hardware processor, for example, a software program. In other embodiments, merchant device 150 may include additional or different modules having specialized hardware and/or software as required.

Sales application 152 may correspond to one or more processes to execute modules and associated specialized hardware of merchant device 150 that provides an interface and/or online marketplace to sell one or more items offered by a merchant (not shown) associated with merchant device 150, and further provide checkout and payment processes for a transaction to purchase the items for sale from the merchant corresponding to merchant device 150, where such transaction processing services may be provided through service provider server 160. In this regard, sales application 152 may correspond to specialized hardware and/or software of merchant device 150 to provide a convenient interface to permit a merchant to offer items for sale. For example, sales application 152 may be implemented as an application offering items for sale that may be utilized by the merchant or a merchant employee to enter items selected by a user to a transaction, determine a price for the transaction, and initiate a checkout and payment process for the transaction.

In other embodiments, sales application 152 may be accessed by communication device 110 to select the items for sale to the user associated with communication device 110. In certain embodiments, sales application 152 may correspond to a website available over the Internet and/or online content and/or database information accessible through a dedicated application. Thus, sales application 152 may provide item sales through an online marketplace using the website of the merchant. However, in other embodiments, merchant device 150 may be local to a physical merchant location and provide transaction processing processes through interfaces displayed to a merchant or merchant employee at the merchant location. Sales application 152 may include information for a price for the item, a discount for the item, a price change for the item, and/or other incentives for items and/or with the merchant corresponding to merchant device 150 (e.g., rebates, payments, etc.). Sales application 152 may be used to set and/or determine a benefit or incentive provided to a user of communication device 110. The sales data and other item data may be retrievable by communication device 110 and/or service provider server 160, such as requestable through an API call, retrievable from a database, and/or scraped from an online resource. Thus, the item information may be used to determine and/or generate a recommendation for the item based on data capturing the item, tagging the item, and identifying a second user receiving the recommendation for the item from the first user.

Sales application 152 may be used to establish a transaction once the second user has selected one or more items for purchase. Once a payment amount is determined for the transaction for the item(s) to be purchased, sales application 152 may request payment from the second user. Sales application 152 may receive payment processing information. Thus, payment may be provided to the merchant account, and notification of payment (or failure, for example, where there are insufficient user funds) may be sent to sales application 152. The payment may be made by service provider server 160 on behalf of the second user. Sales application 152 may then receive the results of the transaction processing, and complete the transaction with the user, for example, by providing the user the items for the transaction or declining the transaction where the user is not authenticated or the transaction is not authorized (e.g., insufficient funds).

Merchant device 150 includes other applications 154 as may be desired in particular embodiments to provide features to merchant device 150. For example, other applications 154 may include security applications for implementing server-side security features, programmatic client applications for interfacing with appropriate application programming interfaces (APIs) over network 170, or other types of applications. Other applications 154 may also include email, texting, voice and IM applications that allow a user to send and receive emails, calls, texts, and other notifications through network 170. In various embodiments, other applications 154 may include financial applications, such as banking, online payments, money transfer, or other applications associated with service provider server 160. Other applications 154 may contain software programs, executable by a processor, including a graphical user interface (GUI) configured to provide an interface to the user.

Merchant device 150 may further include database 156 which may include, for example, identifiers such as operating system registry entries, cookies associated with sales application 152 and/or other applications 154, identifiers associated with hardware of merchant device 150, or other appropriate identifiers, such as identifiers used for payment/user/device authentication or identification. Identifiers in database 156 may be used by a payment/credit provider, such as service provider server 160, to associate merchant device 150 with a particular account maintained by the payment/credit provider. Item, sales, and/or benefit information for items sold by the merchant associated with merchant device 150 may be stored to database 156.

Merchant device 150 includes at least one communication module 158 adapted to communicate with communication device 110 and/or service provider server 160. In various embodiments, communication module 158 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 160 may be maintained, for example, by an online service provider, which may provide transaction processing and payment services. In this regard, service provider server 160 includes one or more processing applications which may be configured to interact with communication device 110, merchant device 150, and/or another device/server to facilitate recommendation of items between users based on data captured by one of the user, as well as processing transactions for the items. In one example, service provider server 160 may be provided by PAYPAL®, Inc. of San Jose, Calif., USA. However, in other embodiments, service provider server 160 may be maintained by or include another type of service provider, which may provide connection services to a plurality of users.

Service provider server 160 of FIG. 1 includes a recommendation application 162, other applications 164, a database 166, and a network interface component 168. Recommendation application 162 and other applications 164 may correspond to executable processes, procedures, and/or applications with associated hardware. In other embodiments, service provider server 160 may include additional or different modules having specialized hardware and/or software as required.

Recommendation application 162 may correspond to one or more processes to execute software modules and associated specialized hardware of service provider server 160 to provide recommendation services to users, for example, by generating a recommendation based on received item shopping or browsing data from a first user and communicating the recommendation to a second user. In this regard, recommendation application 162 may correspond to specialized hardware and/or software to first receive item shopping or browsing data, which may correspond to online browsing or shopping data, or may correspond to audio, video, or audiovisual data captured at a physical merchant location including an object having one or more items. As discussed herein, the item shopping or browsing data may include tag data of one or more tags of items, or may include data necessary to determine a tag. Thus, the tag data may identify an object within the environment, or an item for sale. The tag data of the object in an environment or an item offered for sale may also be determine based on contextual information in the data. Using the tag data, an item for sale from a merchant may be determined, which may be incorporated in the generated recommendation.

The received item shopping or browsing data may also include contextual information to determine and/or identify the second user. In various embodiments, the contextual data may include direct identification of the second user, such as a name or other identifier of the second user. However, in other embodiments, the contextual data may be processed with other data to identify the second user, such as additional users within the captured data, contacts of first user and/or second user, and other types of contextual information. Once the second user is identified, the recommendation may be generated by recommendation application 162. The recommendation may correspond to an offer of sale of the item identified by the first user to the second user. The offer for sale may include purchase information, item retrieval information, and other information allowing for purchase of the item. The recommendation may also or instead include item information, including an image of the item, where the item is located, and other information about the item. The recommendation may correspond to an electronic message, which may be communicated to the second user by the first user.

Recommendation application 162 may also determine an electronic communication channel for distribution or communication of the recommendation to the second user. The selected electronic communication channel may be based on a preference of the second user, an available channel to service provider server 160, and/or based on past use of the channel and/or reactions to recommendations in the second user's channels. Once selected, recommendation application 162 may communicate the recommendation to the second user using the electronic communication channel. Recommendation application 162 may provide the recommendation to the second user within a virtual reality or augmented reality displayable to the second user. For example, the recommendation may be displayed to the second user when the second user is in an environment corresponding to the item. In other embodiments, a virtual object of the item may be displayed to the second user by recommendation application 162 that allows the second user to view the item in other visual data captured by the second user, or add visual data to the virtual reality so that the second user may view other items with or nearby the item in the recommendation. Recommendation application 162 may provide the virtual reality/augmented reality through a device for the second user.

Recommendation application 162 may also utilize user responses by the second user to the recommendation to determine future recommendations and/or the channel to transmit future recommendations. For example, if the second user expresses or does not express interest in a recommendation, or views/ignores recommendations in a communication channel, recommendation application 162 may adjust what recommendations are communicated to the second user and how based on the user reactions of the second user. Recommendation application 162 may also allow the second user to solicit feedback for the recommendation, for example, by posting the recommendation to a social networking platform for the second user and providing feedback by other users to the recommendation displayed to the second user. Additionally, the recommendation may be displayed with other information that may assist the second user in purchasing and/or using the second item, including reviews by other users, walkthroughs on use, and/or tips for purchase/use of the item.

In various embodiments, service provider server 160 includes other applications 164 as may be desired in particular embodiments to provide features to service provider server 160. For example, other applications 164 may include security applications for implementing server-side security features, programmatic client applications for interfacing with appropriate application programming interfaces (APIs) over network 170, or other types of applications. Other applications 164 may contain software programs, executable by a processor, including a graphical user interface (GUI), configured to provide an interface to the user when accessing service provider server 160, where the user or other users may interact with the GUI to more easily view and communicate information. In various embodiments, other applications 164 may include connection and/or communication applications, which may be utilized to communicate information to over network 170.

Additionally, service provider server 160 includes database 166. As previously discussed, the user and/or the merchant may establish one or more digital wallets and/or accounts with service provider server 160. Digital wallets and/or accounts in database 166 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to service provider server 160, e.g., from communication device 110, one or more digital wallets and/or payment accounts belonging to the users may be found. Database 166 may store received item shopping or browsing data, which may include tag data and contextual data, as well as recommendations using the data. Database 166 may also store the user preferences for an account for the user and/or merchant. Database 166 may also store transaction information.

In various embodiments, service provider server 160 includes at least one network interface component 168 adapted to communicate communication device 110 and/or merchant device 150 over network 170. In various embodiments, network interface component 168 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2A:
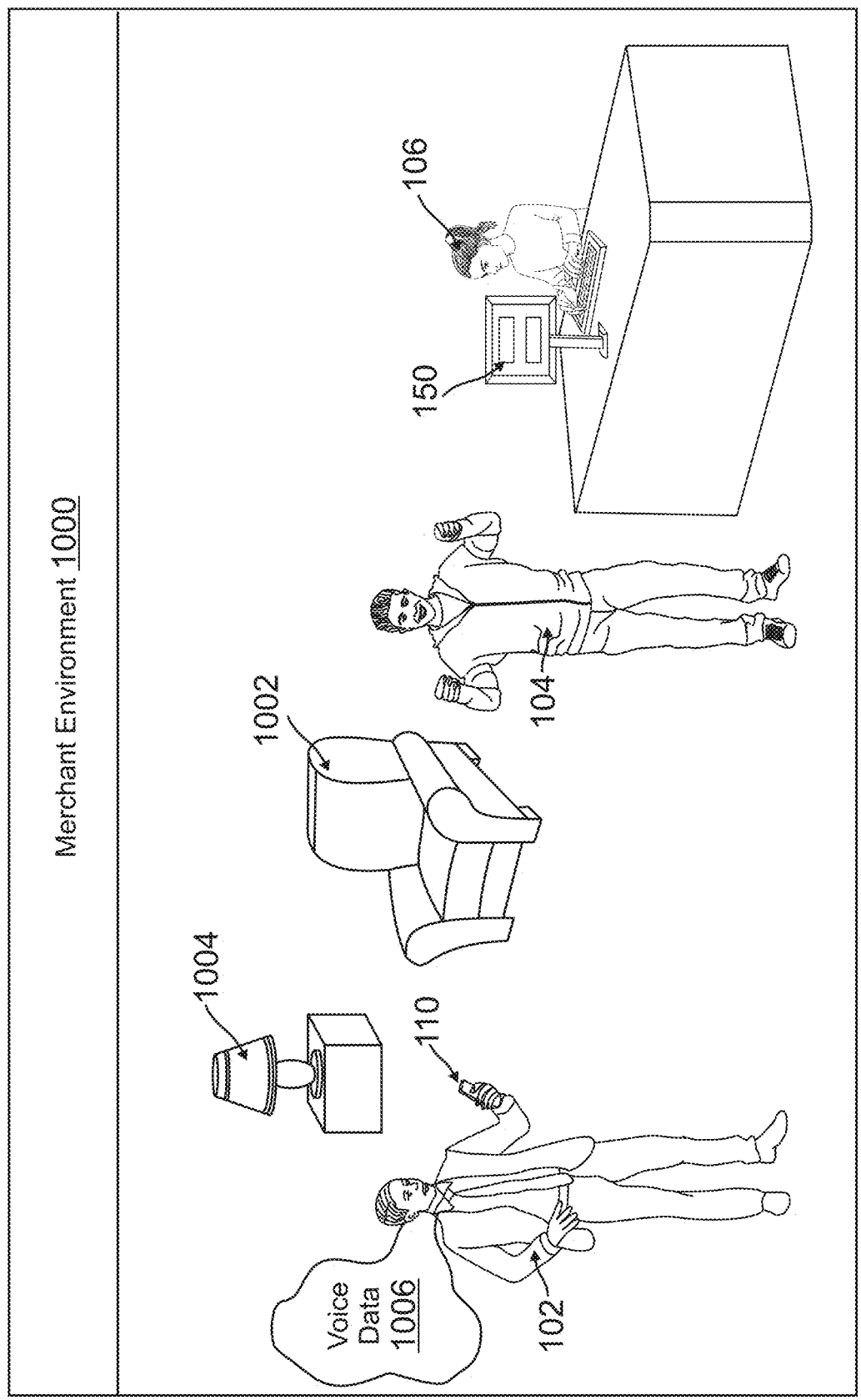
FIG. 2A is an exemplary environment having a first user utilizing a communication device to capture an environment for display of an augmented reality to provide recommendations to a second user, according to an embodiment.

FIG. 2A is an exemplary environment having a first user utilizing a communication device to capture an environment for display of an augmented reality to provide recommendations to a second user, according to an embodiment. FIG. 2A includes an environment 200a of a real-world location having a user 102, a user 104, and a merchant 106. In this regard, user 102 may utilize communication device 110 corresponding generally to the described features, processes, and components of communication device 110 in environment 100 of FIG. 1. Additionally, merchant 106 may utilize merchant device 150 corresponding generally to the described features, processes, and components of merchant device 150 in environment 100 of FIG. 1.

For example, user 102 may utilize communication device 110 to capture audio, video, and/or audiovisual data of a merchant environment 1000 in environment 200*a*. User 102 may view one or more items that user 102 would like to recommend to another user, which may correspond to user 104 or another user not located within merchant environment 1000. Thus, communication device 110 may include one or more input devices to capture the data of user 102 shopping or browsing for items for purchase from merchant environment 1000, including a sofa 1002 and a lamp 1004. Thus, the captured data by communication device 110 may include objects in environment 1000, such as sofa 1002 and lamp 1004. The captured data may also include a representation of user 104, as well as merchant 106 and merchant device 150. Moreover, voice data 10006 spoken by merchant 102 may also be recorded in the captured data. Utilizing the aforementioned data, a recommendation may be made to another user.

For example, voice data 1006 may be utilized to make a tag of sofa 1002 that user 102 wishes to recommend to another user. Thus, voice data 1006 may include information used to identify sofa 1002. Additional information within the captured audio, video, or audiovisual data may be used to determine a tag, such as contextual data of items, users, or other objects within merchant environment 100. For example, the contextual data may show user 104 nearby sofa 1002, which may be utilized where voice data 1006 identifies sofa 1002 near user 104. Similarly, sofa 1002 may be tagged over lamp 1004 based on voice analysis of voice data 1006 including an identifier for sofa 1002 and/or a location of sofa 1002 relative to lamp 1004. Additionally, in order to identify the other user for the recommendation, sofa 1002, user 104, and/or merchant 106 may be used, for example, if user 102 identifies the other user as being related to user 104 or enjoying shopping at merchant 106. Using such contextual data, a service provider may generate a recommendation for the other user. In various embodiments, communication device 110 may perform the processing of the captured audio, video, and/or audiovisual data to generate the tag. However, in other embodiments, the captured data may be communicated to a service provider, which may determine the tag, process the contextual information, and generate a recommendation of sofa 1002 to the other user specified by user 102.

Figure 2B:
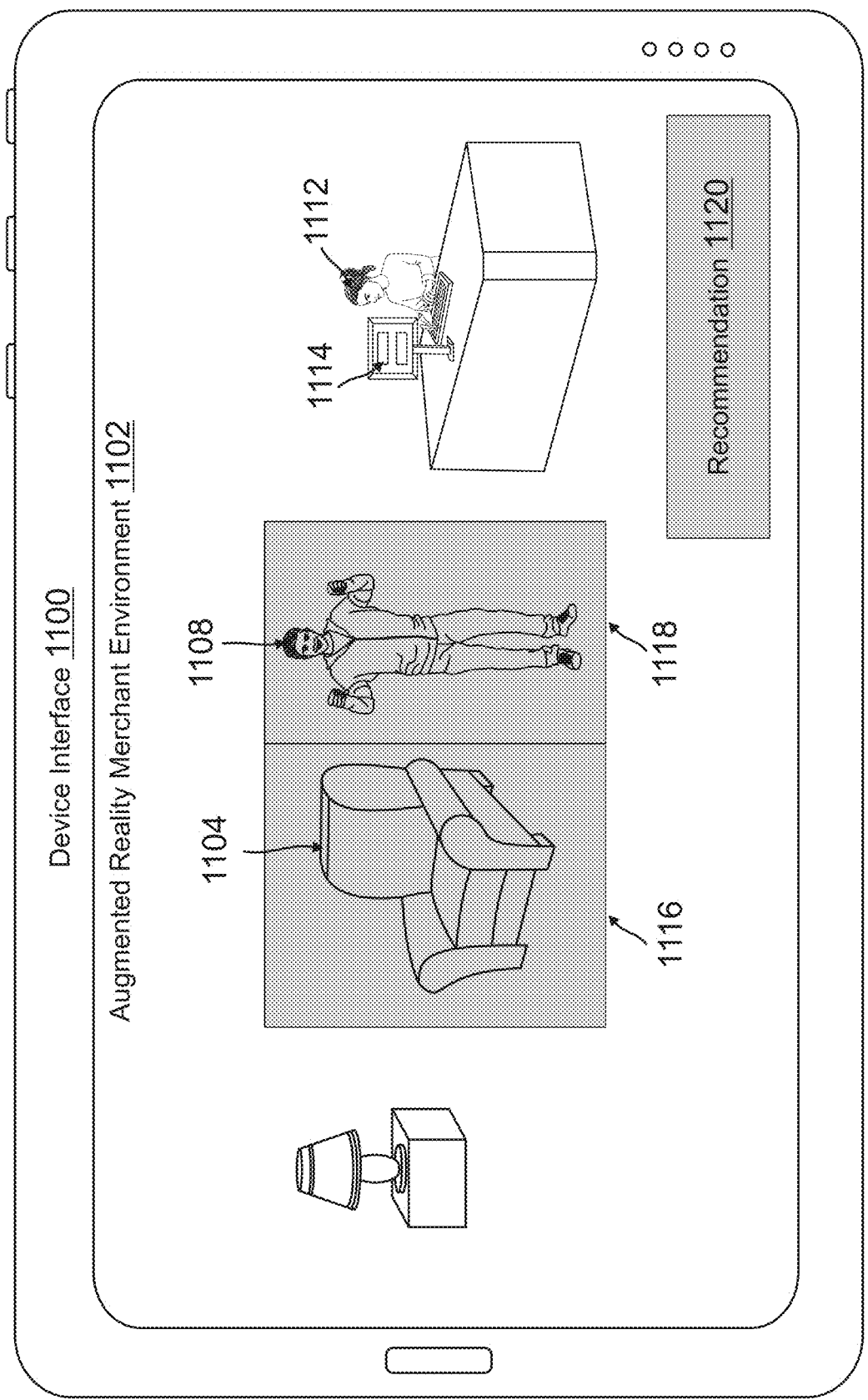
FIG. 2B is an exemplary interface of a communication device displaying an augmented reality to provide recommendations by a first user to a second user, according to an embodiment.

FIG. 2B is an exemplary interface of a communication device displaying an augmented reality to provide recommendations by a first user to a second user, according to an embodiment. FIG. 2B includes a device interface 1100 of a communication device, for example, corresponding generally to the described features, processes, and components of communication device 110 in environment 100 of FIG. 1. In this regard, a user utilizing the communication device may view device interface 1100 on the communication device, where device interface 1100 corresponds to an interface (e.g., an operating system interface, application interface, or other graphic user interface) displaying data from an application, such as visual data processing application 130 of communication device 110 in environment 100 of FIG. 1.

In this regard, device interface 1100 displays captured audiovisual data of an environment, such as merchant environment 1000 in FIG. 2A. However, the displayed audiovisual data output through a display device of the communication device may be displayed as an augmented reality having graphics overlaid onto environment data so that the graphics show up in the environment and alter the output or view/content of the environment. For example, device interface 1100 includes an augmented reality merchant environment 1102 that display users, items, and other objects captured in merchant environment 1000 as output visual data within device interface 1100. For example, sofa 1002 in FIG. 2A may be displayed as a virtual representation of a virtual sofa 1104 in augmented reality merchant environment 1102 displayed through device interface 1100. Similarly, a virtual lamp 1110 may correspond to lamp 1004 in FIG. 2A, a virtual merchant 1112 may correspond to merchant 106 in FIG. 2A, a virtual merchant device 1114 may correspond to merchant device 150 in FIG. 2A, and a virtual user 1118 may correspond to user 104 in FIG. 2A. Moreover, augmented reality merchant environment 1102 may also include graphics overlaid onto the output virtual environment representing merchant environment 1000. For example, tag box 1116 may show a highlight around virtual sofa 1104 based on information received during capturing of merchant environment 1000 in FIG. 2A. For example, voice data 1006 in FIG. 2A may include necessary data to determine tag box 1116, or may be utilized with contextual data processed from images or video captured of merchant environment 1000. Similarly, tag box 1118 may show a tag of virtual user 1108, which may be determined from data within audio, video, or audiovisual data captured by the communication device associated with device interface 1100.

Figure 2C:
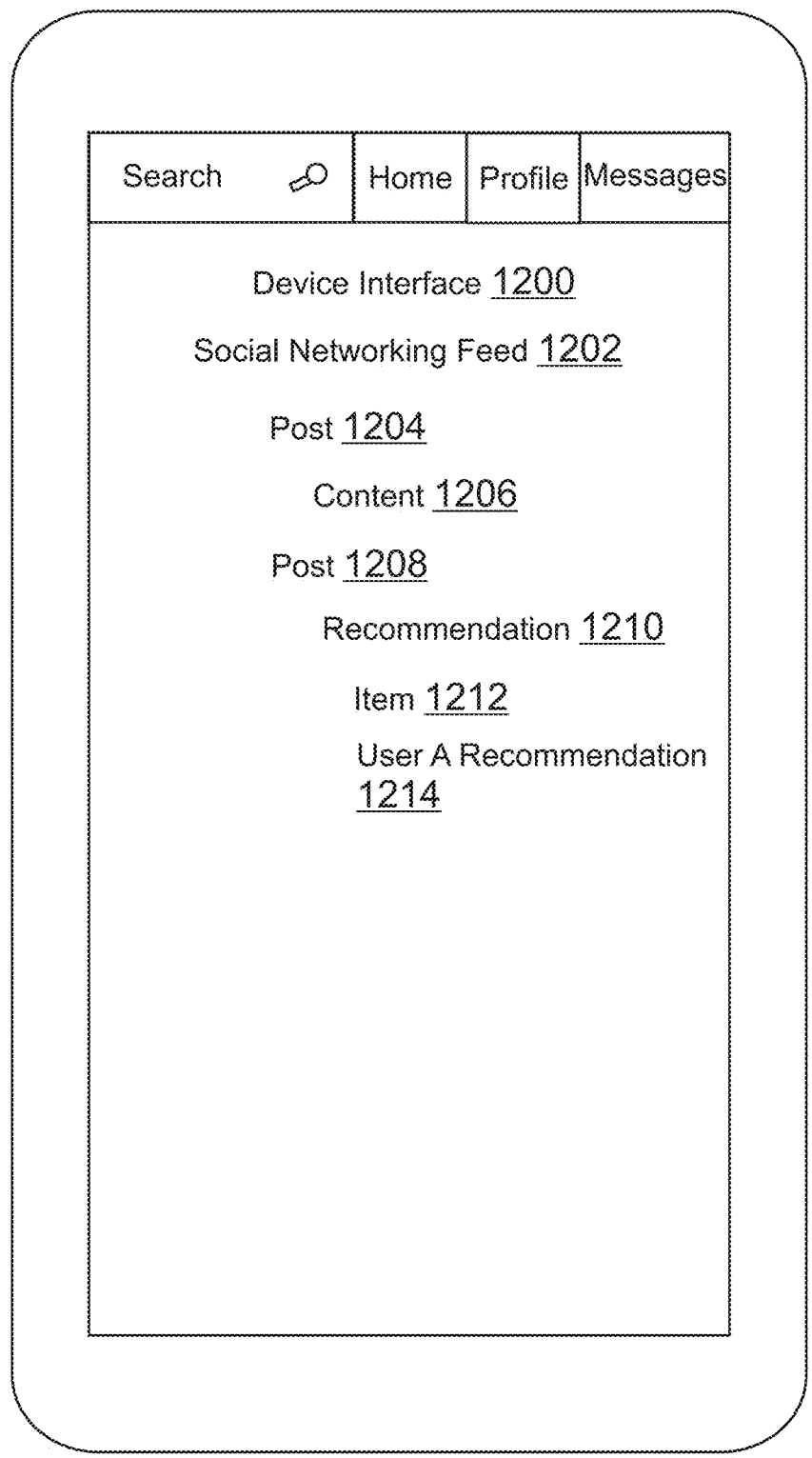
FIG. 2C is an exemplary interface of a device displaying recommendations made by a first user to a second user based on tags and contextual data in an environment, according to an embodiment.

FIG. 2C is an exemplary interface of a device displaying recommendations made by a first user to a second user based on tags and contextual data in an environment, according to an embodiment. FIG. 2C displays a device interface of a device for a user receiving a recommendation from another user, for example, based on audio, video, or audiovisual data captured at a merchant location. In this regard, device interface 1200 may display recommendations through a communication channel selected to transmit the recommendations. For example, recommendations may be transmitted through a social networking service. Thus, device interface 1200 includes a social networking feed 1202, where social networking feed 1202 may include a post 1204 having content 1206, such as a post by a friend or associate that is linked to a social networking account for social networking feed 1202. Additionally, social networking feed 1202 includes a post 1208 having a recommendation 1210. Additionally, recommendation 1210 may include information for the recommend item 1212 by the other user, as well as a user A recommendation 1214 providing information on why item 1212 was recommended in recommendation 1210.

Figure 3:
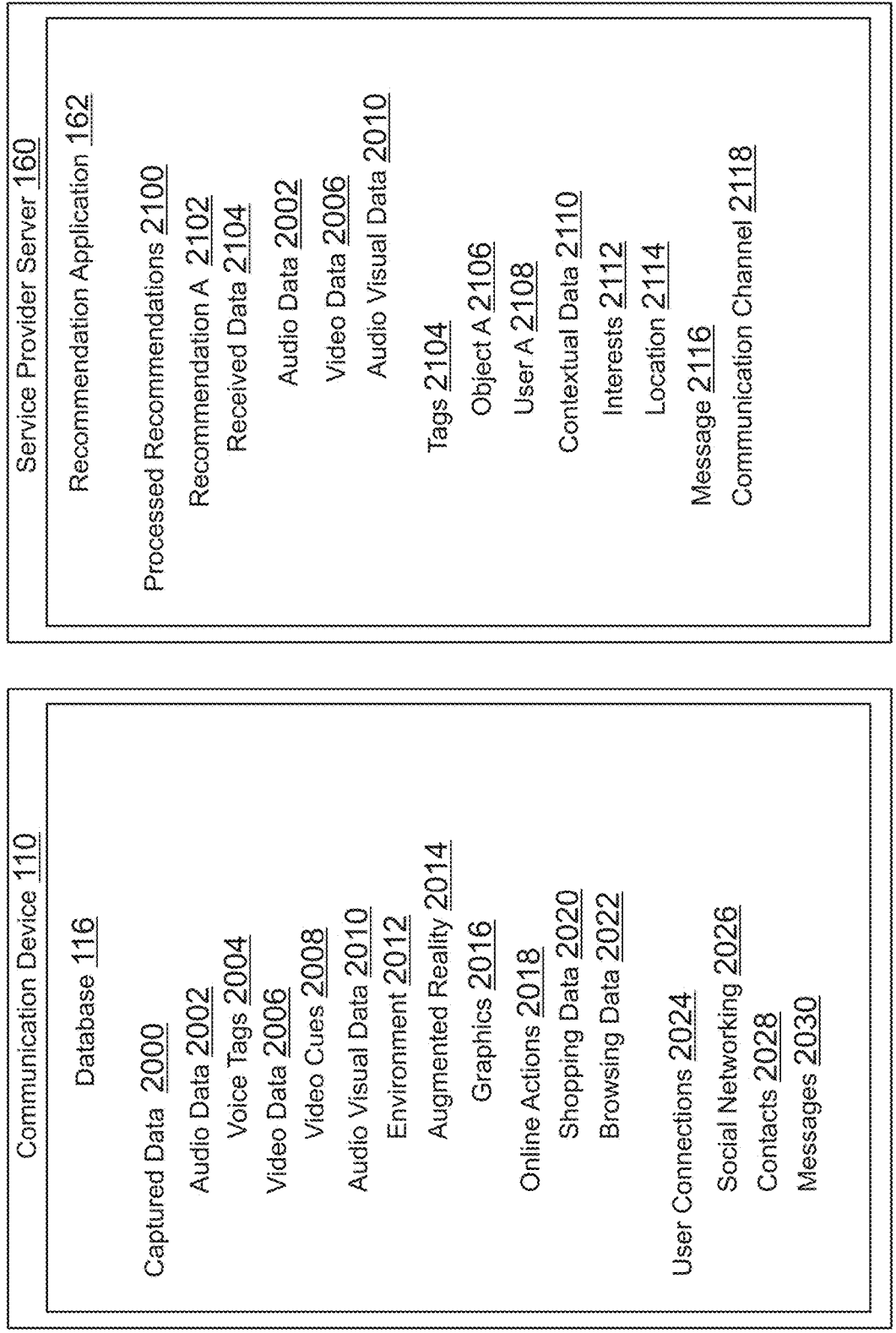
FIG. 3 is an exemplary system environment showing a communication device and a service provider server interacting to provide recommendations by a first user to a second user based on tags and contextual data in an environment, according to an embodiment.

FIG. 3 is an exemplary system environment showing a communication device and a service provider server interacting to provide recommendations by a first user to a second user based on tags and contextual data in an environment, according to an embodiment. FIG. 3 includes communication device 110 and service provider server 160 corresponding generally to communication device 110 and service provider server 160 discussed in reference to environment 100 of FIG. 1.

Communication device 110 includes database 116 corresponding generally to the stored and processed data utilized by processes and features discussed in reference to the applications of communication device 110 in environment 100 of FIG. 1. In this regard, database 116 includes captured audio, video, and/or audiovisual data, as well as information processed from such data, such as tag data, contextual data, and processed recommendations. For example, database 116 includes captured data 2000, including audio data 2002, video data 2006, and audiovisual data 2010. In various embodiments, instead of all three of audio data 2002, video data 2006, and audiovisual data 2010, one or more of audio data 2002, video data 2006, and audiovisual data 2010 may be captured instead. Additionally, audio data is shown with voice tags 2004, video data 2006 with video cues 2008, and audiovisual data 2010 with an environment 2012 and an augmented reality 2014 having graphics 2016. In this regard, voice tags 2004 and/or video cues 2008 may be processed with environment 2012 to determine augmented reality 2014, which may include graphics 2016 overlaid onto environment 2012. In other embodiments, captured data 2000 may include online actions 2018 having shopping data 2020 and/or browsing data 2022. Additionally, database 116 includes user connections 2024, which may be used to determine a recommendation by service provider server 160, such as information for a user's social networking 2026, contacts 2028, and/or messages 2030.

Service provider server 160 includes recommendation application 162 corresponding generally to the processes and features discussed in reference to recommendation application 162 in environment 100 of FIG. 1. In this regard, recommendation application 162 includes processed recommendations 2100, which may be determined from captured data 2000 received from communication device 110. IN this regard, a recommendation A 2012 may be determined based on received data 2104, such as audio data 2002, video data 2006, and/or audiovisual data 2010. For example, tags 2014 may be determined for recommendation A 2102 based on received data 2104. Tags 2104 may include an object A 2106 and/or a user A 2108. Moreover, received data 2104 may be processed to determine contextual data 2110, which may include any interests 2112, locations, 2114, and/or other data used to determine a recommendation for another user. Recommendation A 2102 may also include a message 2116 for transmission with recommendation A 2102, and may be transmitted using a communication channel 2118 selected by service provider server 160.

Figure 4:
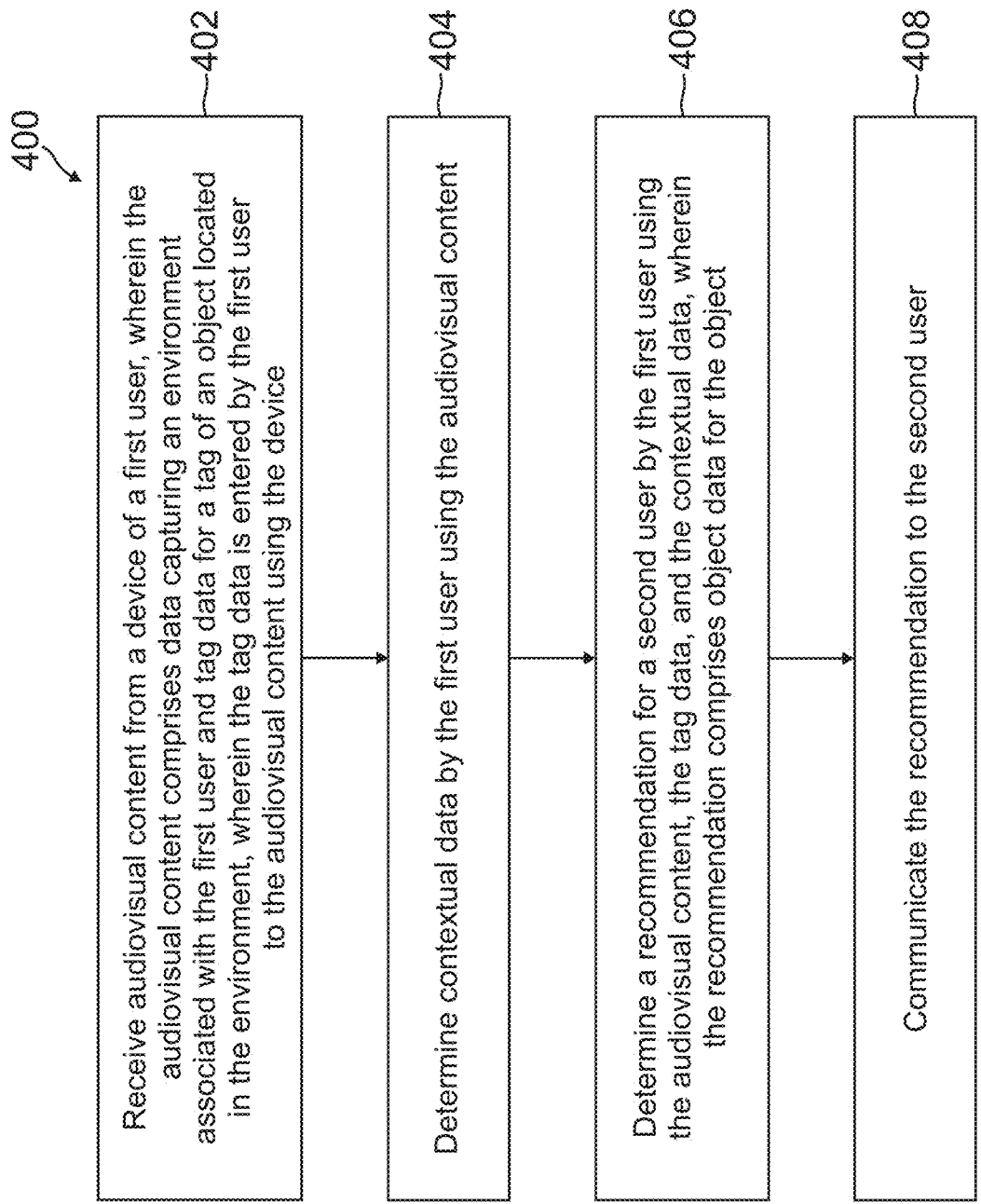
FIG. 4 is a flowchart of an exemplary process for contextual data in augmented reality processing for item recommendations, according to an embodiment.

FIG. 4 is a flowchart of an exemplary process for contextual data in augmented reality processing for item recommendations, according to an embodiment. Note that one or more steps, processes, and methods described herein may be omitted, performed in a different sequence, or combined as desired or appropriate.

At step 402, audiovisual content is received from a device of a first user, wherein the audiovisual content comprises data capturing an environment associated with the first user and tag data for a tag of an object located in the environment, wherein the tag data is entered by the first user to the audiovisual content using the device. The audiovisual content may comprise audio data of the first user, wherein the audio of the first user comprises a statement of the tag of the object by the first user. Thus, the tag data may be determined from the audio data in the audiovisual content. The tag data may comprise an identification of the second user by the first user, wherein determining recommendation uses the identification of the second user to determine that the recommendation is for the second user. In various embodiments, item data may instead be received from a device of the user, where a query for the first user to select the tag within online shopping data may be transmitted to the device, wherein the shopping data is received in response to the query from the device. The shopping data may comprise one of visual data at a merchant location for the merchant selling the item or browsing data of the user from an online marketplace of the merchant Contextual data is determined by the first user using the audiovisual content, at step 404. The contextual data may be determined based on visual data recognition of the second user in the audiovisual content, audio data recognition of a name or identifier of the second user in the audiovisual content, object identification of at least the object in the audiovisual content, visual data of the first user or the object, audio data of a conversation by the first user, or metadata of the audiovisual content. The contextual data may comprise user identification of the second user or object identification of the object. At step 406, a recommendation for a second user by the first user is determined using the audiovisual content, the tag data, and the contextual data, wherein the recommendation comprises object data for the object.

At step 408, the recommendation is communicated to the second user. Augmented reality data may be generated for the environment, wherein the augmented reality data comprises visual data of the environment associated with the tag of the object and the recommendation for the second user. The augmented reality data may be communicated to the device of the first user. The tag and the recommendation may comprise graphic objects overlaid onto a visual representation of the environment in the visual data. The device of the first user may comprise one of a mobile computing device and a wearable computing device, wherein the audiovisual content is captured by the device and displayed on a display screen of the device. The augmented reality data may further comprise data displaying interests of the second user, past purchases of the second user, comments by the second user, or comments by a third user associated with or about the second user. The recommendation may be communicated to the second user through an electronic communication channel, and wherein the electronic communication channel is one of selected by the second user, determined for the second user based on available communication channels for the second user, favored by the second user based on past use of the available communication channels, and selected by the first user. The recommendation may comprise an offer for purchase of the object by the second user, wherein the recommendation comprises identification of the first user recommending the object to the second user.

Figure 5:
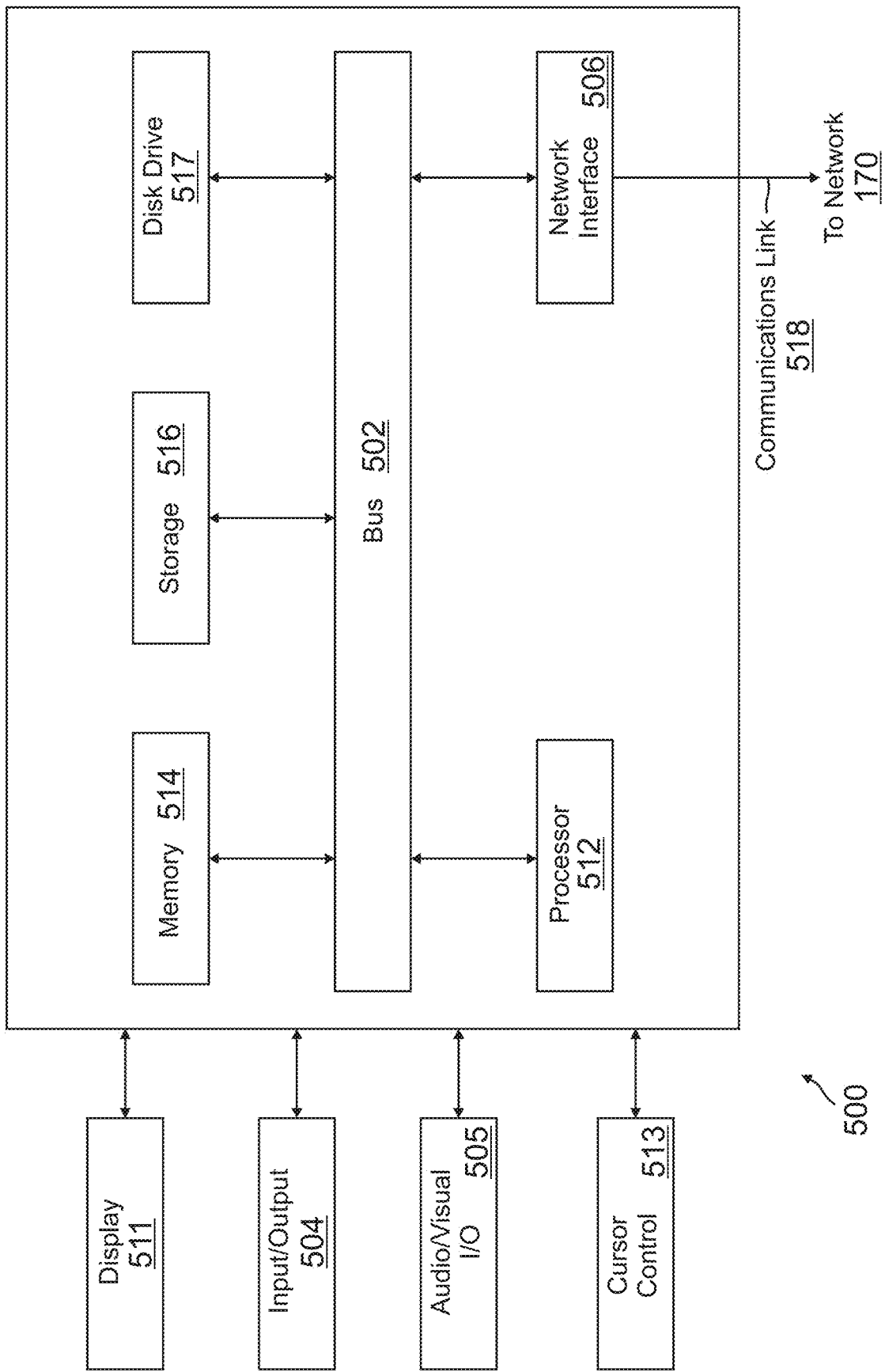
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   receiving audiovisual content from a device of a first user, wherein the audiovisual content comprises data capturing an environment associated with the first user, a visual cue by the first user indicating an object located in the environment, and audio data of the first user comprising a verbal instruction of the first user designating a location of the object in the environment and voice content associated with a second user provided by a third user present in the audiovisual content;
   determining the location of the object in the environment and a description of the object at the location based on the verbal instruction;
   determining that the first user has selected the object in the environment based on the visual cue, the location, and the description;
   determining an item for sale associated with the object;
   determining contextual data using the audiovisual content;
   determining social networking information for the first user, wherein the social networking information comprises contacts of the first user;
   determining a name of the second user associated with the first user based on the voice content, the contextual data, and the social networking information, wherein the voice content by the third user comprises the name of the second user;
   determining a social graph of the first user with the second user based on the name and the contacts;
   determining a second user account identifier for the second user based on the name, wherein the second user account identifier is associated with an electronic communication channel based on a preference of the second user;
   determining a recommendation of the item associated with the object for the second user by the first user based on the audiovisual content, wherein the recommendation comprises item data for the item;
   generating visual content for display of the recommendation to the second user, wherein the visual content comprises the recommendation, the social graph, and a comment by the third user from the voice content provided by the third user; and communicating the visual content to the second user using the second user account identifier and the electronic communication channel.

2. The system of claim 1, wherein the contextual data is determined based on visual data recognition of the second user in the audiovisual content, audio data recognition of the name of the second user in the audiovisual content, the audio data of the first user, or metadata of the audiovisual content.

3. The system of claim 2, wherein the audiovisual content further comprises a user identification of the second user or an object identification of the object.

4. The system of claim 1, wherein the audiovisual content comprises the audio data of the first user, and wherein the audio data of the first user comprises a statement of the object.

5. The system of claim 4, wherein the operations further comprise:
generating augmented reality data for the environment, wherein the augmented reality data comprises visual data of the environment with a visual tag of the object and the recommendation for the second user; and
communicating the augmented reality data to the device of the first user.

6. The system of claim 5, wherein the visual tag and the recommendation comprise graphic objects overlaid onto a visual representation of the environment in the visual data.

7. The system of claim 5, wherein the device of the first user comprises one of a mobile computing device or a wearable computing device, and wherein the audiovisual content is received through the data displayed on a display screen of the device.

8. The system of claim 5, wherein the augmented reality data further comprises data displaying an interest of the second user or a past purchase of the second user.

9. The system of claim 1, wherein the contextual data comprises an identification of the second user by the first user, and wherein prior to the determining the name, the operations further comprise:
determining that the object has been selected for the second user based on the identification of the second user.

10. The system of claim 1, wherein the preference for the electronic communication channel is one of determined for the second user based on available communication channels for the second user or favored by the second user based on past use of the available communication channels.

11. The system of claim 1, wherein the recommendation comprises an offer for purchase of the object by the second user.

12. A computing device system comprising:
a non-transitory memory; and
one or more hardware processors coupled to the non-transitory memory and configured to read instructions from the non-transitory memory to cause the computing device system to perform operations comprising:
receiving visual data and audio data of an environment associated with a first user, and wherein the environment includes an item for sale by a merchant and a visual cue by the first user indicating the item, and wherein audio data comprises a verbal instruction of the first user designating a location of the item in the environment and voice content associated with a second user provided by a third user present in the visual data;

determining the location of the item in the environment and a description of the item at the location based on the verbal instruction;
determining a selection of the item in the environment indicated by the visual cue, the location, and the description;
determining a digital item for sale associated with the item;
determining social networking information for the first user, wherein the social networking information comprises contacts of the first user;
determining a name of the second user associated with the first user based on the audio data and the social networking information, wherein the voice content by the third user includes the name of the second user;
determining a social graph of the first user with the second user based on the name and the contacts;
determining a second user account identifier for the second user based on the name, wherein the second user account identifier is associated with an electronic communication channel based on a preference of the second user;
receiving recommendation input associated with the selection of the item, wherein the recommendation input comprises a recommendation of the digital item to the second user;
generating a visual display of the recommendation to the second user, wherein the visual display comprises the recommendation, the social graph, and a comment by the third user from the voice content provided by the third user; and
communicating the visual data, the selection, and the visual display of the recommendation input to a service provider associated with the second user account identifier via the electronic communication channel.

13. The computing device system of claim 12, wherein the operations further comprise:
presenting an augmented reality within an application interface of a device of the first user, wherein the augmented reality displays the environment, and wherein the selection and the recommendation input are displayed a graphics within the augmented reality.

14. The computing device system of claim 13, wherein the operations further comprise:
receiving user information for the second user, wherein the user information comprises at least one of an image of the second user or an interest of the second user; and
presenting the user information as an additional graphic within the augmented reality.

15. The computing device system of claim 13, wherein the operations further comprise:
receiving a response to the recommendation from the second user; and
outputting the response within the augmented reality.

16. The computing device system of claim 12, wherein the recommendation input is received from the first user through the audio data or the visual data.

17. A method comprising:
receiving shopping data from a device of a first user, wherein the shopping data comprises item data for a first item for sale from a merchant, a visual cue by the first user indicating the first item in the shopping data, and audio data comprising a verbal instruction designating a location of the first item by the first user and voice content associated with a second user by a third user associated with the audio data;

determining the location of the first item and a description of the first item at the location based on the verbal instruction;

determining that the first user has selected the first item in the shopping data based on the visual cue, the location, and the description;

determining a second item for sale associated with the first item;

determining contextual data associated with the shopping data by the first user;

determining social networking information for the first user, wherein the social networking information comprises contacts of the first user;

determining a name of a second user associated with the first user based on voice content, the contextual data, and the social networking information, wherein the voice content by the third user comprises the name of the second user;

determining a social graph of the first user with the second user based on the name and the contacts;

determining a second user account identifier for the second user based on the name, wherein the second user account identifier is associated with an electronic communication channel based on a preference of the second user;

determining a purchase recommendation for the second user by the first user, wherein the purchase recommendation comprises a recommendation notification to the second user associated with a purchase of the second item by the second user;

determining, using a recommendation engine of a service provider, the electronic communication channel for distribution of the purchase recommendation to the second user based on the preference;

generating visual content for display of the purchase recommendation to the second user, wherein the visual content comprises the purchase recommendation, the social graph, and a comment by the third user from the voice content provided by the third user; and communicating the visual content to the second user through the electronic communication channel using the second user account identifier.

18. The method of claim 17, wherein prior to the receiving the shopping data, the method further comprises:

receiving the item data from the device of the first user; and transmitting, to the device, a query for the first user to select the first item within the shopping data, wherein the shopping data is received in response to the query from the device.

19. The method of claim 17, wherein the electronic communication channel comprises one of a plurality of communication channels accessible to the second user, and wherein the method further comprises:

determining an advertisement strategy for advertising the purchase recommendation to the second user, wherein the electronic communication channel is further determined based on the advertisement strategy.

20. The method of claim 17, wherein the shopping data comprises one of visual data at a merchant location for the merchant selling the first item or browsing data of the first user from an online marketplace of the merchant.

\* \* \* \* \*